United States Patent
Johansson et al.

(10) Patent No.: US 9,491,155 B1
(45) Date of Patent: Nov. 8, 2016

(54) ACCOUNT GENERATION BASED ON EXTERNAL CREDENTIALS

(71) Applicant: AMAZON TECHNOLOGIES, INC., Reno, NV (US)

(72) Inventors: Jesper Mikael Johansson, Redmond, WA (US); Cheng Hung Hui, Beijing (CN); Gang Liu, Beijing (CN); Feng Xue, Beijing (CN)

(73) Assignee: Amazon Technologies, Inc., Reno, NV (US)

( * ) Notice: Subject to any disclaimer, the term of this patent is extended or adjusted under 35 U.S.C. 154(b) by 104 days.

(21) Appl. No.: 14/458,999

(22) Filed: Aug. 13, 2014

(51) Int. Cl.
*G06F 7/04* (2006.01)
*H04L 29/06* (2006.01)
*G06F 21/31* (2013.01)
*G06F 21/44* (2013.01)

(52) U.S. Cl.
CPC .............. *H04L 63/08* (2013.01); *H04L 63/10* (2013.01); *G06F 21/31* (2013.01); *G06F 21/44* (2013.01); *H04L 63/083* (2013.01); *H04L 63/0853* (2013.01); *H04L 2463/082* (2013.01)

(58) Field of Classification Search
CPC ... H04L 63/08; H04L 63/10; H04L 63/0853; H04L 2463/082; H04L 63/083; G06F 21/31; G06F 21/44
See application file for complete search history.

(56) References Cited

U.S. PATENT DOCUMENTS

| | | |
|---|---|---|
| 8,621,209 B1 | 12/2013 | Johansson et al. |
| 8,626,665 B2 | 1/2014 | Bui |
| 8,683,597 B1 | 3/2014 | Johansson et al. |
| 9,166,961 B1 | 10/2015 | Johansson et al. |
| 2007/0180504 A1* | 8/2007 | Hung .................... G06F 21/335 726/5 |
| 2008/0015986 A1* | 1/2008 | Wright .................. G06Q 20/40 705/44 |
| 2015/0046990 A1* | 2/2015 | Oberheide ............. G06F 21/32 726/6 |

* cited by examiner

*Primary Examiner* — Techane Gergiso
(74) *Attorney, Agent, or Firm* — Lindauer Law, PLLC

(57) ABSTRACT

Techniques are described for using a credential, such as a user identifier associated with an account on a first service, to create a reusable account on a second service. The account may be initially activated based on the receipt of a passcode sent to the account on the first service. The account may be created with access to a subset of features on the second service. On receiving a password for the account, the account may be modified to access a broader feature set. The account may be reusable via a cookie or other token placed on a user device, and reusability may be disabled on detecting possible security risk conditions associated with the user identifier.

18 Claims, 10 Drawing Sheets

ACCOUNT GENERATION BASED ON EXTERNAL CREDENTIALS

BACKGROUND

To increase sales or web site traffic, online merchants and other providers of online services may seek to improve the experience of users visiting their web sites. In some cases, improvements to user experience may include providing faster and easier ways for users to access a web site. However, providing faster and easier access to a web site may increase the risk of unauthorized accesses, fraudulent transactions, or other types of malicious activities on the web site.

Figure 1:
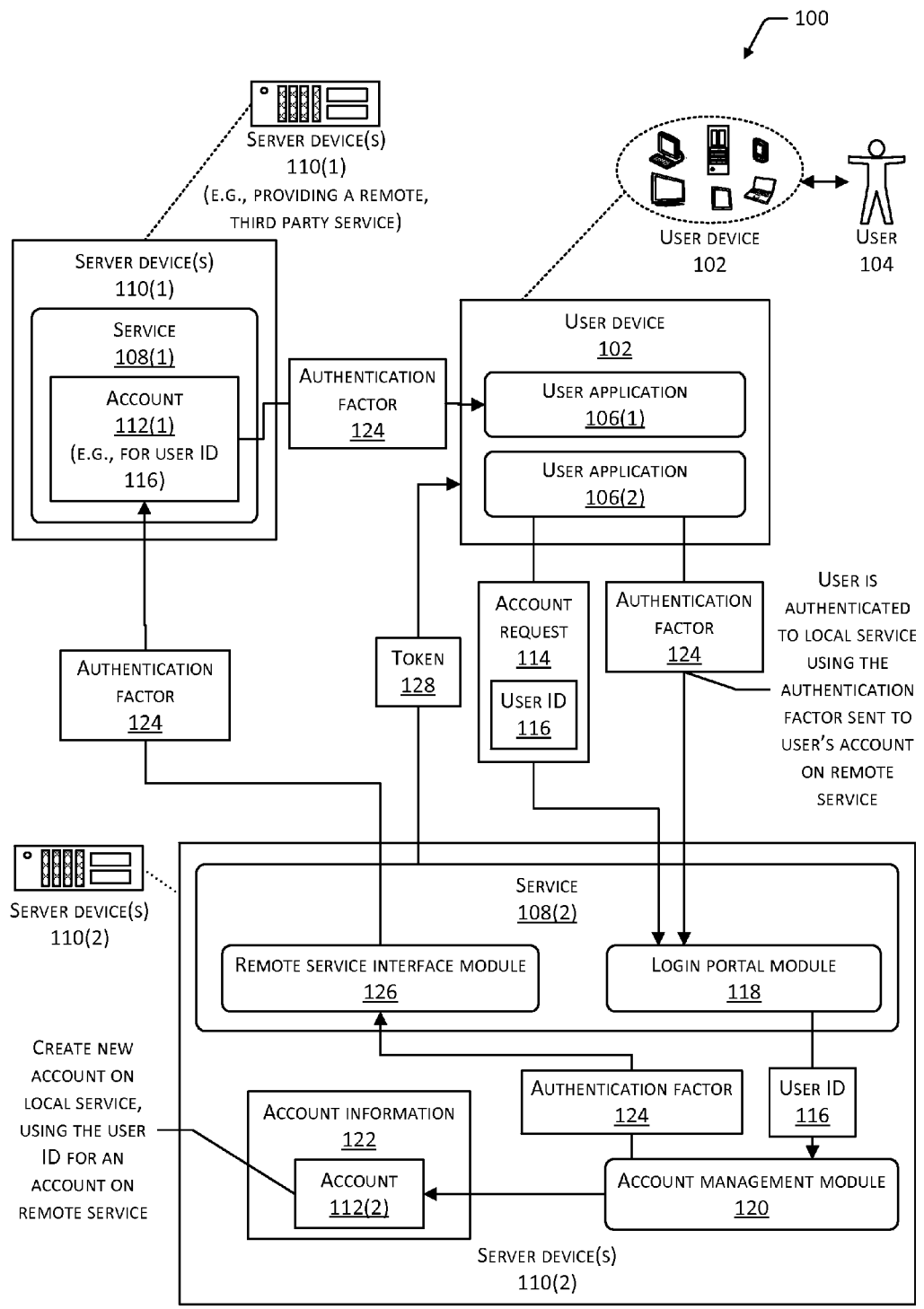
FIG. 1 depicts an environment for employing a user identifier of an account on a first service to create an account on a second service.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for creating a user account on a second service using a user identifier (ID) for a user account on a first service. In some implementations, a user may send an account request to access the second service, the account request specifying a user ID for an account on the first service. In some cases, the specified user ID may be a user name, user login, or other credential associated with the user's account on the first service. For example, the second service may be an online store and the first service may be an online social networking service, online payment service, online merchant (e.g., e-commerce site), online communication service, and so forth. The user may navigate to a login page or other portal of the second service, and enter the user ID associated with the account on the first service. Implementations may then create an account for the user on the second service, the newly created account employing the specified user ID as a user name or login credential. An authentication factor (e.g., a passcode) may be generated and sent to the user's account on the first service. After retrieving the authentication factor from the account on the first service, the user may provide the authentication factor to authenticate the user to the second service and activate the account on the second service. The user may then employ the account to access features of the second service.

In some implementations, the creation of the account on the second service may be substantially unperceivable by (e.g., transparent to) the user. For example, the user may perceive that he or she is accessing the second service using the user ID associated with the account on the first service, but the user may not perceive that a new account has been created on the second service to provide such access. In some cases, the account may be initially created with a password that is unpublished in that it is not provided to the user. Such a password may be generated by a random or pseudo-random password generation process, and may be sufficiently long to ensure it may not be guessed by another user or process attempting unauthorized access to the account.

In some implementations, the account may be configured to have access rights to a subset of the features available on the second service. For example, in cases where the second service is an online merchant or another type of electronic commerce web site, the account may be used to purchase items but may not be used to modify the customer's shipping address or stored payment methods. Accordingly, implementations may provide for a limited access account on the second service that employs a user ID from another account on the first service. Some implementations may enable the user to provide a password or some other type of additional credential for the account. In such cases, the access rights of the account may be modified to enable the user to access a broader subset of (e.g., all) the features of the second service using the account. For example, the user may provide a password for the account to edit the user's shipping address, modify the stored payment methods for the user, or perform other actions. In some cases, the initially created account may be employable by the user for various activities that exhibit a lower risk of fraudulent use than other activities. The user may then specify an additional credential (e.g., password) for the account to enable the use of the account for activities that exhibit a higher risk, such as modifying shipping information or payment methods. A subset of features of a service may include all of the available features of the service, or may include fewer than all of the available features.

The account on the second service may be reusable by the user to access features of the second service after the creation of the account. In some implementations, a token may be stored on a user device and that token may be retrieved and authenticated during subsequent logins to the second service using the user ID of the account on the first service. In some cases, the token may be a Hypertext Transfer Protocol (HTTP) cookie that is associated with the user's account on the second service. In some implementations, the use of the token to access the account may be barred based on one or more conditions that indicate a potential fraudulent use of the account, such as a security breach of the first service or suspicious user behavior exhibited through the account. In such cases, the user may be prompted to re-authenticate using the passcode-based authentication process described below.

An account may include any type of account that may be employed by a user or a process to access a computing device or a service executing on a computing device. An account may be associated with one or more users, and the account may include stored data associated with the user(s). Such data may include identifying information for the user(s) such as name, address information, contact information, demographic information regarding the user(s), or other information. The data may also include historical information regarding the use of the account by the user(s), such as browsing history, purchase history, shipment history, and so forth. An account may be accessed through the provision of any number of credentials, including but not limited to a user ID (e.g., user name, login, handle, nick, or tag), password, token, passcode, digital certificate, response to challenge question, and so forth.

FIG. 1 depicts an environment 100 in which implementations may operate to create an account on a second service using a user ID of an account on a first service. The environment 100 may include any number of user devices 102. A user device 102 may be any type of computing device, including but not limited to a personal computer, a smartphone, a tablet computer, a wearable computer, an implanted computer, a mobile gaming device, an electronic book reader, an automotive computer, a desktop computer, a laptop computer, a game console, a home entertainment device, and so forth. Although examples herein may describe the user device 102 as a physically separate device, implementations are not so limited. In some cases, the user device 102 may include one or more of a virtual computing environment, a hypervisor, a device emulation, or a virtual machine executing on one or more physical computing devices. The user device 102 may be operated by a user 104. The user device 102 is described further with reference to FIG. 3.

In some implementations, the user device 102 may execute any number of user applications 106 that each enables the user 104 to access one or more features of a service 108. The user application(s) 106 may include web application(s) provided by web server(s) executing on one or more server devices 110 and presented to the user 104 through a web browser executing on the user device 102. In such cases, the user application(s) 106 may be described using a programming language such as any version of Hypertext Markup Language (HTML), Dynamic HTML (DHTML), Extensible Markup Language (XML), Extensible HTML (XHTML) and so forth. The user application(s) 106 may also include dynamic content described using a programming language, including any version of JavaScript™, VBScript™, Perl™, Common Gateway Interface (CGI), Cascading Style Sheets (CSS), other types of style sheets, and so forth. Implementations support the use of any web browser to present the user application(s) 106.

In some implementations, the user application(s) 106 may be native application(s). A native application may be written using any compiled or interpreted programming language, including but not limited to Java', Objective-C™, C++, and so forth. A native application may be designed and written to be executed by the processor(s) of the user device 102, within an operating system (OS) of the user device 102, and at least partly outside of a web browser. In cases where the user application(s) 106 include native application(s), the user application(s) 106 may communicate with service(s) 108 executing on the server device(s) 110.

The server device(s) 110 may include any type of computing device, including but not limited to a network computer, a cloud computing device, a mainframe computer, or any of the types of computing devices listed with reference to the user device 102. In some cases, two or more of the server devices 110 may comprise a cluster, cloud, farm, or other grouping of multiple devices that coordinate operations to provide load balancing, failover support, parallel processing capabilities, shared storage resources, or other aspects. Although examples herein may describe the server device(s) 110 as physically separate devices, implementations are not so limited. In some cases, the server device(s) 110 may include one or more of a virtual computing environment, a hypervisor, a device emulation, or a virtual machine executing on one or more physical computing devices. The server device(s) 110 are described further with reference to FIG. 4.

In the example of FIG. 1, the user device 102 executes a user application 106(1) that is configured to interact with a service 108(1) executing on server device(s) 110(1), and the user device 102 executes a user application 106(2) that is configured to interact with a service 108(2) executing on server device(s) 110(2). However, implementations are not limited to this example. In some implementations, the user device 102 may execute a user application 106 that is configured to interact with the service 108(1) and the service 108(2). In such cases, the operations described as being performed by the user applications 106(1) and 106(2) may be performed by a same user application 106. Moreover, in some implementations the service 108(1) may execute on a same set of one or more server devices 110 as the service 108(2). In some implementations, the service 108(1) may include an account 112(1) that enables the user 104 (e.g., employing the user application 106(1)) to access the service 108(1).

In some implementations, the user 104 may employ the user application 106(2) to generate and send an account request 114 to the service 108(2) executing on the server device(s) 110(2). The account request 114 may be a request that the user 104 be provided access to the service 108(2). The account request 114 may include a user ID 116 for the account 112(1) on the service 108(1). The user ID 116 may be employable by the user 104 to log into the account 112(1) on the service 108(1). For example, the user ID 116 may be a login credential such as a user name, handle, gamer tag, nickname, profile name, or some other ID that uniquely identifies the user 104 while the user 104 is accessing feature(s) of the service 112(1). In some cases, the account request 114 may be generated by the user entering the user ID 116 through a login web page of the user application 106(2) or through one or more user interface controls that constitute a login dialog or window of the user application 106(2). In some cases, the account request 114 may be received by a login portal module 118 that is executing as a component of the service 108(2). One or both of the service 108(2) or the login portal module 118 may provide the user ID 116 to an account management module 120 executing on the service device(s) 110(2). Although the example of FIG. 1 depicts the account management module 120 as executing separately from the service 108(2), in some implementations the account management module 120 may execute as a component of the service 108(2). In cases where the account request 114 specifies the user ID 116, the account management module 120 may create an account 112(2) that includes the user ID 116. The newly created account 112(2) may be created such that the user 104 may access the account 112(2) using the user ID 116 as a login credential, and employ the account 112(2) to access one or more features of the service 108(2). In some implementations, the account 112(2) may be created with access rights such that the account 112(2) may be employed by the user 104 to access a subset of the features of the service 108(2). In some implementations, the account 112(2) may be created such that the user 104 is not provided an indication that the account 112(2) has been created.

The server device(s) 110(2) may store account information 122 that includes data for the account 112(2). Although the example of FIG. 1 depicts the account information 122 as being stored on the server device(s) 110(2), in some implementations the account information 122 may be stored on another device that is accessible to the server device(s) 110(2) over one or more networks. The account information 122 is described further with reference to FIG. 2.

The account management module 120 may generate an authentication factor 124 associated with the account 112(2). The authentication factor 124 may be any type of knowledge-based authentication factor including one or more passwords, one or more passphrases (e.g., including multiple words), one or more passcodes (e.g., a numeric code), one or more answers to challenge question(s), and so forth. The authentication factor 124 may be of any length, and may be alphabet, numeric, or alphanumeric. In some cases, the authentication factor 124 may be generated through a random or pseudo-random password generation algorithm. The authentication factor 124 may be uniquely associated with the account 112(2) with respect to a predetermined period of time. For example, the authentication factor 124 may have a unique, one-to-one correspondence with the account 112(2) during a thirty day period, five day period, or other time period, such that another account 112(2) may not be associated with the same authentication factor 124 during that time period. In some implementations, the account management module 120 may store the authentication factor 124 in a table or other data structure that associates the authentication factor 124 with the user ID 116 or another identifier of the account 112(2).

In some implementations, the service 108(2) may include a remote service interface module 126 that is configured to communicate with the service 108(1) executing on the server device(s) 110(1). The remote service interface module 126 may access the service 108(1) via an application programming interface (API) exposed by the service 108(1) to enable external processes to interface with feature(s) of the service 108(1). Although FIG. 1 depicts the remote service interface module 126 as a component of the service 108(2), in some implementations the remote service interface module 126 may execute separately from the service 108(2). The remote service interface module 126 may communicate the authentication factor 124 to the account 112(1) on the service 108(1). In some implementations, the remote service interface module 126 may send a message such as an email, text message, or other type of communication to the account 112(1), and the message may include the authentication factor 124. The message may also include instructions on how to employ the authentication factor 124 to access the account 112(2) on the service 108(2). In some cases, the authentication factor 124 may be valid for a predetermined period of time from when it is generated or from when it is sent to the account 112(1). In such cases, the authentication factor 124 may not be employed to access the account 112(2) after the period of time has elapsed.

The user 104 may employ the user application 106(1) to log into the account 112(1) on the service 108(1) and retrieve the authentication factor 124. The user 104 may then employ the user application 106(2) to provide the authentication factor 124 to the login portal module 118. For example, the login web page of the service 108(2) may include a text box or other control in which the user 104 may enter the authentication factor 124. The login portal module 118 may compare the authentication factor 124 to the authentication factor 124 previously generated for the account 112(2). If the entered authentication factor 124 matches the previously generated authentication factor 124, the login portal module 118 may authenticate the user 104 and activate the account 112(2).

In some implementations, the service 108(2) may generate a token 128 that is communicated to the user device 102. The token 128 may be a digital sequence of information that includes any amount of data in any format. The token 128 may be generated via a random or pseudo-random process to include a random or pseudo-random sequence of data of any length. In some implementations, the token 128 may be associated with the account 112(2), and the server device(s) 110(2) may store token information (e.g., a table) that associates the token 128 with the user ID 116 of the account 112(2). In some implementations, the token 128 may be uniquely associated with the account 112(2). Moreover, the token 128 may be associated with a particular communication session between the user device 102 and the server device(s) 110(2), such as a Hypertext Transfer Protocol (HTTP) session or HTTP Secure (HTTPS) session. The token 128 may be received during one or more subsequent login requests to access the account 112(2), and such access may be provided if the received token 128 corresponds to the token 128 that was communicated to the user device 102. Accordingly, the token 128 may indicate or establish the communication session between the user device 102 and the server device(s) 110(2) across multiple logins to the account 112(2). In some implementations, the token 128 may be provided to the user device 102 as a HTTP cookie that is stored in a location accessible to the web browser that executes the user application 106(2). The creation of the account 112(2), and the authentication and activation of the account 112(2) using the passcode-based authentication process, is described further with reference to FIGS. 5 and 6.

During subsequent login request(s) in which the user 104 specifies the user ID 116 to access the service 108(2), the service 108(2) may retrieve the token 128 previously stored on the user device 102. If the retrieved token 128 matches the previously provided token 128, the user 104 may be provided access to the service 108(2) through the account 112(2). If the retrieved token 128 does not match and is therefore not authenticated, the user 104 may be prompted to repeat the passcode-based authentication process described above. In such cases, a new account 112(2) may be created that is associated with the user ID 116, and the previously created account 112(2) may be disabled or deleted. In some implementations, the information related to the previously created account 112(2) such as purchase history, payment methods and so forth may not be transferred to the new account 112(2). Through use of the token 128, implementations enable reusability of the account 112(2). Such reusability is described further with reference to FIGS. 7 and 8.

Implementations may also employ other techniques to provide reusability of the account 112(2). For example, instead of providing the token 128 to the user device 102, the service 108(2) may determine a device ID that is uniquely associated with the user device 102 such as a telephone number, a processor ID, or a media access control (MAC) address. On creating the account 112(2), a mapping between the device ID and the user ID 116 may be stored in a table or other data structure. On receiving a subsequent login request specifying the user ID 116, implementations may retrieve the device ID from the requesting user device 102 and compare it to the previously stored device ID associated with the user ID 116. If the device IDs match, the user 104 may be provided access to the service 108(2) through the account 112(2). In cases where the device ID is a telephone number associated with the user device 102, authentication of the user 104 may include querying the telephone service provider to determine whether that telephone number is still associated with the same user 104.

In some implementations, the account 112(2) may be created with access rights to access a subset of the service 108(2). For example, the account 112(2) may be used to purchase items but may not be used to modify the shipping address or stored payment methods for the user 104. To access a broader subset of the features of the service 108(2), or all the features, the user 104 may be requested to provide a password or some other type of additional credential. The access rights of the account 112(2) may be modified to enable the user 104 to access a broader subset of (e.g., all) the features of the service 108(2) using the account 112(2). In some cases, until the user 104 provides the additional credential (e.g., password), the account 112(2) may not be given access to those features of the service 108(2) that may enable fraudulent use of the account 112(2) such as editing a shipping address or altering a payment instrument. By providing an additional credential, the user 104 may request that the account 112(2) be converted to an account with broader access. Such a conversion is described further with reference to FIG. 9.

In some implementations, the process for creating the account 112(2) may be transparent to or unperceivable by the user 104 in that the user 104 may not be aware that the account 112(2) has been created in response to the account request 114 specifying the user ID 116. From the perspective of the user 104, the user 104 is being provided access to the service 108(2) via his or her external credential, e.g., the user ID 116 that is the login of the external, remote, third party service 108(1). Accordingly, implementations enable a somewhat simplified registration process for the new user 104 to enable expedited access to at least some of the features of the service 108(2). In some cases, the user 104 may not be aware that the account 112(2) exists unless or until the user 104 specifies an additional credential (e.g., password) to convert the account 112(2) to have broader access to the features of the service 108(2).

In some implementations, the creation of the account 112(2) to enable the user 104 to access the service 108(2) may not depend on the third party service 108(1) supporting any particular standard for third party authorization or user authentication. For example, the third party service 108(1) may not support a standard that includes the issuing of access tokens 128 by the third party service 108(1) to enable access to the service 108(2), such as a version of the OAuth standard.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol.

Figure 2:
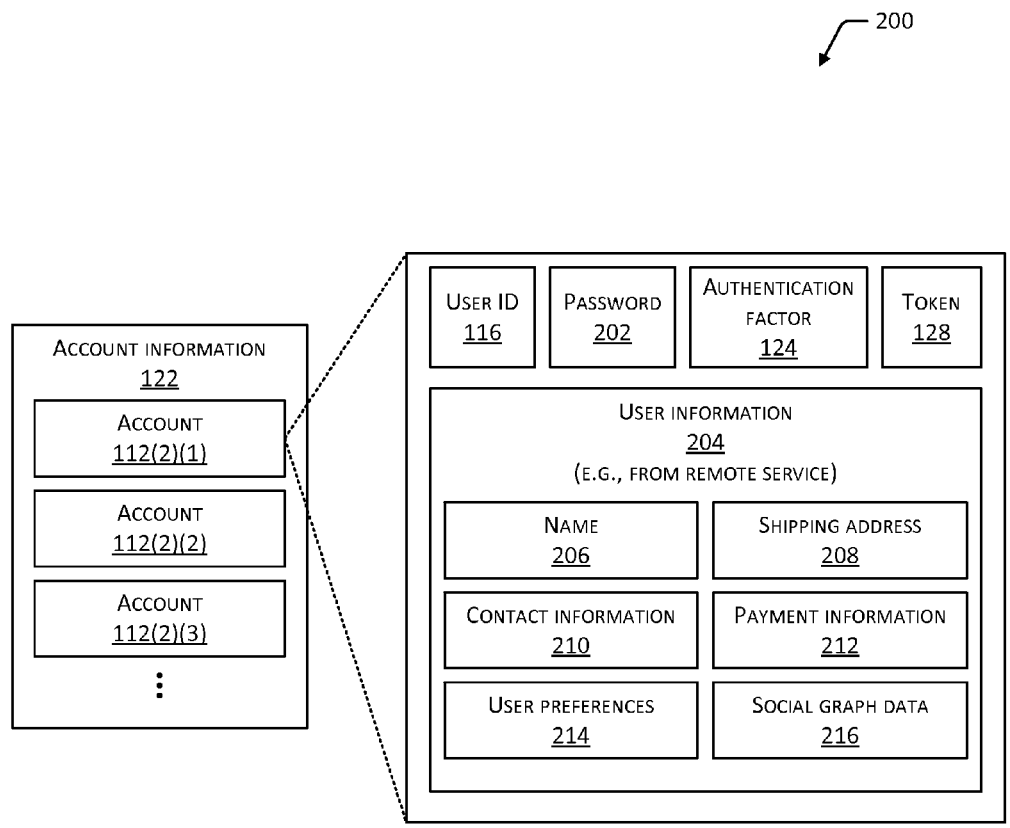
FIG. 2 depicts an example of account information storing data for one or more user accounts.

FIG. 2 depicts an example 200 of the account information 122 that stores data for any number of accounts 112(2) created based on user IDs 116 for a remote service 108(1). As shown in FIG. 2, the record for a particular account 112(2) may include one or more of the user ID 116, the authentication factor 124, or the token 128. The record may also include a password 202. In some implementations, the account 112(2) may be created to include a password 202 that is randomly or pseudo-randomly generated and that is long enough to reduce the likelihood that it may be guessed. The initial password 202 may be stored internally on the server device(s) 110(2) and may not be exposed to the user 104. In some cases, the account 112(2) may be created without a password 202, or with a password 202 that is null or blank such that that password 202 does not include any information. The user 104 may later specify a password 202 to gain access to a broader set of features of the service 108(2). In such cases, the user 104 may then employ the user ID 116 and the password 202 to log into the service 108(2).

In some implementations, the record for the account 112(2) may also include user information 204. The user information 204 may be requested and received from the remote service 108(1), e.g., through an API employed by the remote service interface module 126. The user information 204 may include a name 206 of the user 104, such as one or more of a first name (e.g., given name), last name (e.g., family name or surname), middle name, nickname, or title. The user information 204 may include a shipping address 208 indicating a location where the user 104 may receive deliveries. The user information 204 may also include other contact information 210, such as a home address, a business address, email address(es), telephone number(s), and so forth. In some cases, the user information 204 may include payment information 212 such as a payment history for the user 104. The user information 204 may also include user preferences 214, such as the preferred language(s) of the user 104.

The user information 204 may also include social graph data 216 gathered by the remote service 108(1). The social graph data 216 may list any number of friends, family members, neighbors, colleagues, or other acquaintances of the user 104 and may indicate their relationship(s) with the user 104. The social graph data 216 may indicate immediate acquaintances of the user 104, such as family members, friends, business colleagues, and so forth. The social graph data 216 may also indicate more distant relationships between the user 104 and others, such as second degree relationships (e.g., friends of friends, family members of friends), third degree relationships (e.g., friends of friends of friends), and so forth. In some implementations, at least a portion of the user information 204 may be employed to authenticate the user 104 in response to subsequent login requests specifying the user ID 116, as described further with reference to FIGS. 7 and 8.

In some implementations, the social graph data 216 may be employed to determine whether the user 104 submitting a login request to access the account 112(2) is the same user 104 who submitted a previous login request or who submitted the account request 114. The social graph data 216 may describe the social networking behavior of the user 104 on one or more online social networks. The social graph data 216 may be determined based on the user's contact lists, friend lists, address book data, messages, transaction data, purchases, refunds, activity data, product reviews, reputational information, subscriptions, or other information.

The social graph data 216 for the user 104 may include any number of relationships involving the user 104 and other entities. Accordingly, the social graph data 216 may describe any number of symmetric or asymmetric relationships between the user 104 and other entities such as other users, groups, companies, brands, products, organizations, and so forth. A symmetric relationship may correspond to a relationship between two parties where both parties have explicitly consented to the relationship. By contrast, an asymmetric relationship may correspond to a relationship between two parties where only one party has explicitly consented to the relationship. Each relationship may specify a name or other identification of the other entity, and a degree of relationship between the user 104 and the other entity. For example, the relationship may be a direct relationship indicating that the user 104 is acquainted with the other entity. Alternatively, a relationship may be an indirect relationship such that the user 104 is included in a chain of acquaintance in which any number of entities are intermediary between the user 104 and the other entity (e.g., second degree, third degree relationships, and so forth).

In some cases, the social graph data 216 for the user 104 may be requested from the third party service 108(1) and compared to previously received social graph data 216 for the user 104 to determine whether the identity of the user 104 has changed. Such an analysis may include determining an identity confidence level based on a degree of similarity or overlap between the two sets of social graph data 216. The identity confidence level may be higher if the two sets of social graph data 216 share a larger number of entities or relationships in common. In some cases, the identity confidence level may be based at least partly on reputations of the entities in the social graph data 216. The reputation of an entity may indicate a degree to which the entity is trusted within a social network. The presence of higher reputation entities in the overlapping social graph data 216 may lead to a determination of a higher identity confidence level. In some implementations, the identity of the user 104 may be verified if the determined identity confidence level meets or exceeds a predetermined threshold level.

Although FIG. 2 depicts the account information 122 as being stored in a single data structure (e.g., table), implementations are not so limited. In some implementations, the account information 122 may be stored in multiple tables that are associated with each other via the user ID 116 or other key data attribute. For example, the authentication factor(s) 124 may be stored in a separate table from the password(s) 202, and both tables may employ the user ID 116 as a primary key. Alternatively, the multiple tables may employ, as a primary key or a secondary key, an ID that is uniquely associated with the user ID 116.

Implementations may ensure the privacy of the user information 204 by requesting permission to use data associated with the user 104. Such a request may be configured as an "opt in," in which the user information 204 may not be collected, processed, or used prior to receiving explicit permission to do so from the user 104 associated with the user information 204. Alternatively, implementations may employ an "opt out" paradigm, in which the collection, processing, and use of the user information 204 are discontinued on receiving a request to do so from the user 104.

Figure 3:
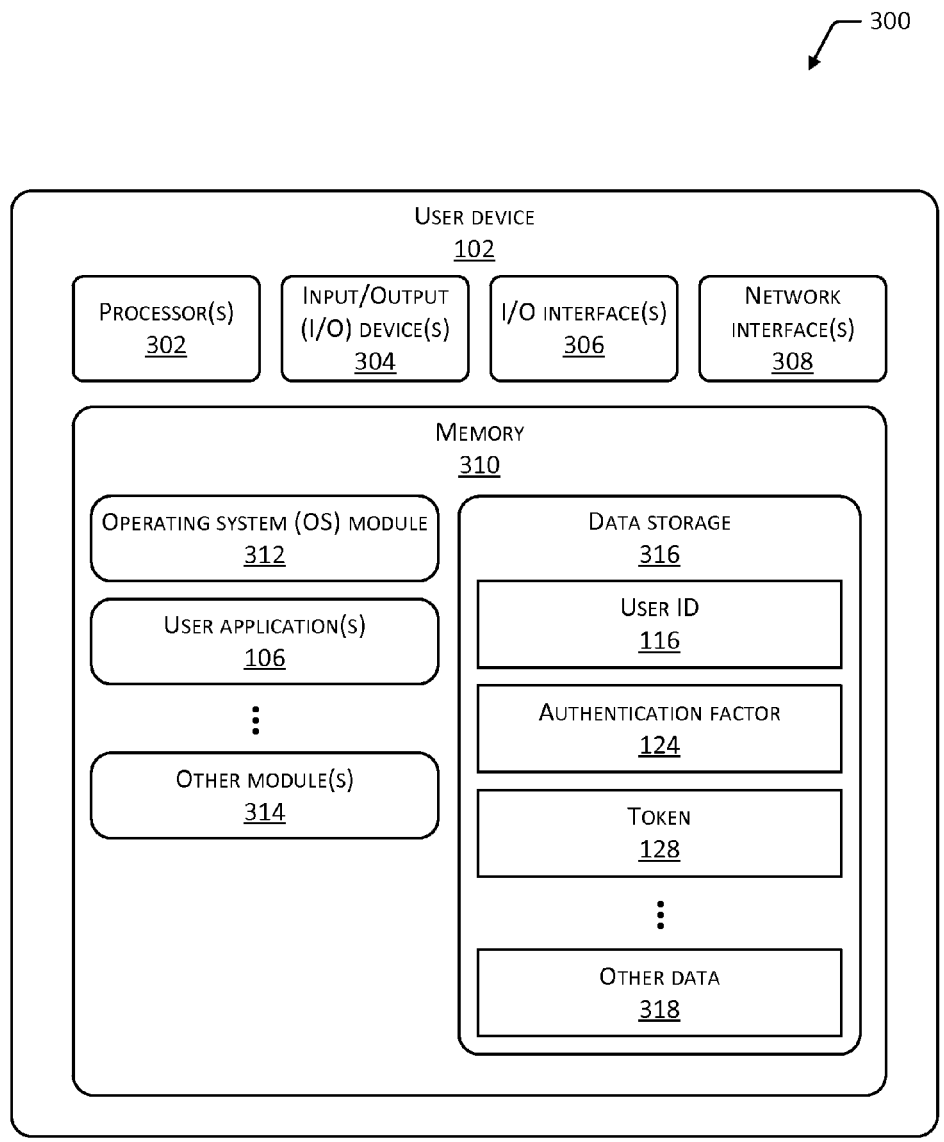
FIG. 3 depicts a block diagram of an example user device that may be employed by a user to access services such as the first or second service.

FIG. 3 depicts a block diagram 300 of an example of the user device 102. As shown in the block diagram 300, the user device 102 may include one or more processors 302 (e.g., hardware-based processor(s)) configured to execute one or more stored instructions. The processor(s) 302 may comprise one or more cores.

The user device 102 may include one or more input/output (I/O) devices 304. The I/O device(s) 304 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 304 may also include output devices such as a display, an audio output device (e.g., a speaker), a printer, a haptic output device, and so forth. The I/O device(s) 304 may be physically incorporated with the user device 102 or may be externally placed.

The user device 102 may include one or more I/O interfaces 306 to enable components or modules of the user device 102 to control, interface with, or otherwise communicate with the I/O device(s) 304. The I/O interface(s) 306 may enable information to be transferred in or out of the user device 102 or between components of the user device 102, through serial communication, parallel communication, or other types of communication. For example, the I/O interface(s) 306 may comply with a version of the RS-232 standard for serial ports, or with a version of the IEEE 1284 standard for parallel ports. As another example, the I/O interface(s) 306 may be configured to provide a connection over Universal Serial Bus (USB) or Ethernet. In some cases, the I/O interface(s) 306 may be configured to provide a serial connection that is compliant with a version of the IEEE 1394 standard. The user device 102 may also include one or more busses or other internal communications hardware or software that allow for the transfer of data between the various modules and components of the user device 102.

The user device 102 may include one or more network interfaces 308 that enable communications between the user device 102 and other network accessible computing devices, such as the server device(s) 110. The network interface(s) 308 may include one or more network interface controllers (NICs) or other types of transceiver devices configured to send and receive communications over a network.

The user device 102 may include one or more memories, described herein as memory 310. The memory 310 comprises one or more computer-readable storage media (CRSM). The CRSM may include one or more of an electronic storage medium, a magnetic storage medium, an optical storage medium, a quantum storage medium, a mechanical computer storage medium, and so forth. The memory 310 provides storage of computer-readable instructions that may describe data structures, program modules, processes, applications, or other data for the operation of the user device 102. In some implementations, the memory 310 may provide storage of computer-readable instructions or other information in a non-transitory format.

The memory 310 may include an OS module 312. The OS module 312 may be configured to manage hardware resources such as the I/O device(s) 304, the I/O interface(s) 306, and the network interface(s) 308, and to provide various services to applications, processes, or modules executing on the processor(s) 302. The OS module 312 may include one or more of the following: any version of the Linux™ OS; any version of iOS from Apple Corp. of Cupertino, Calif., USA; any version of Windows' or Windows Mobile' from Microsoft Corp. of Redmond, Wash., USA; any version of Android' from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The memory 310 may include one or more of the modules described above as executing on the user device 102, such as the user application(s) 106. The memory 310 may also include one or more other modules 314, such as a user authentication module or an access control module to secure access to the user device 102, and so forth.

The memory 310 may include data storage 316 to store data for operations of the user device 102. The data storage 316 may comprise a database, array, structured list, tree, or other data structure, and may be a relational or a non-relational datastore. The data storage 316 may store data such as that described above, including one or more of the user ID 116, the authentication factor 124, or the token 128. The data storage 316 may also store other data 318, such as user authentication information or access control data. In some implementations, at least a portion of the information stored in the data storage 316 may be stored externally to the user device 102, on other devices that may communicate with the user device 102 via the I/O interface(s) 306 or via the network interface(s) 308.

Figure 4:
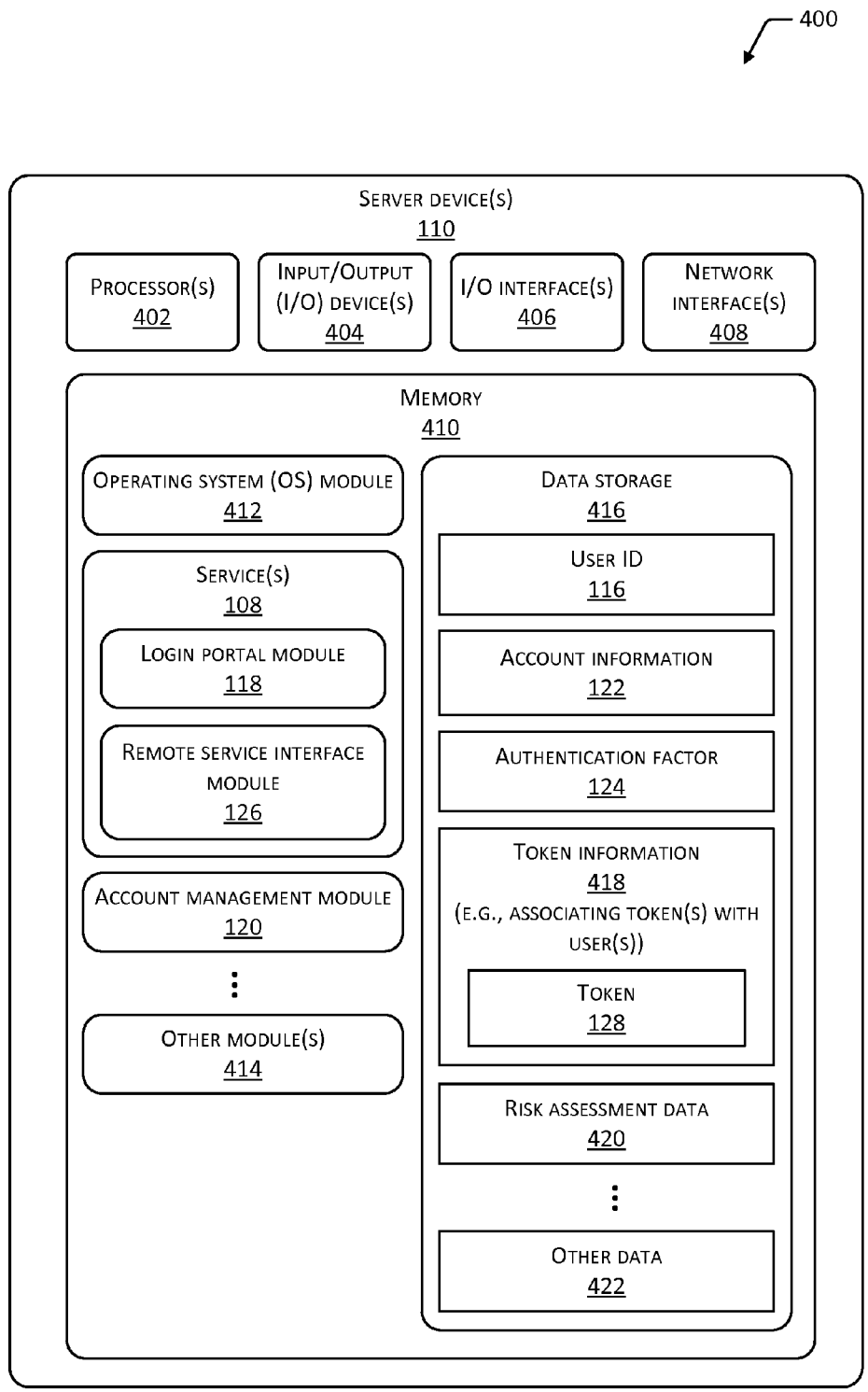
FIG. 4 depicts a block diagram of an example server device that may provide a service such as the first or second service, and that may be configured to create an account on the second service based on the user identifier of the account on the first service.

FIG. 4 depicts a block diagram 400 of an example of the server device(s) 110. As shown in the block diagram 400, the server device(s) 110 may include one or more processors 402 (e.g., hardware-based processor(s)) configured to execute one or more stored instructions. The processor(s) 402 may comprise one or more cores. The server device(s) 110 may include one or more I/O devices 404, one or more I/O interfaces 406, and one or more network interfaces 408 as described above respectively with reference to the I/O device(s) 304, the I/O interface(s) 306, and the network interface(s) 308.

The server device(s) 110 may include one or more memories, described herein as memory 410. The memory 410 comprises one or more CRSM, as described above with reference to the memory 310. The memory 410 may include an OS module 412 that is configured to manage hardware resources such as the I/O device(s) 404, the I/O interface(s) 406, and the network interface(s) 408, and to provide various services to applications, processes, or modules executing on the processor(s) 402. The OS module 412 may include one or more of the operating systems described above with reference to the OS module 312. The memory 410 may include one or more of the modules described above as executing on the server device(s) 110, such as one or more of the service(s) 108, the login portal module 118, the remote service interface module 126, or the account management module 120. The memory 410 may also include one or more other modules 414, such as a user authentication module or an access control module to secure access to the server device(s) 110, and so forth.

The memory 410 may include the data storage 416, which may store data for operations of the server device(s) 110. The data storage 416 may comprise a database, array, structured list, tree, or other data structure, and may be a relational or a non-relational datastore. The data storage 416 may store data such as that described above as present on the server device(s) 110, including one or more of the user ID 116, the account information 122, or the authentication factor 124. In some implementations, the data storage 416 may include token information 418 that associates one or more tokens 128 with user(s) 104 or that associates one or more tokens 128 with account(s) 112(2). In some implementations, the data storage 416 may store risk assessment data 420. The risk assessment data 420 may be employed by implementations to determine whether the account 112(2) may be subsequently employed to access the service 108(2) or whether another account 112(2) is to be created for the user ID 116. For example, the risk assessment data 420 may include information that the remote service 108(1) has experienced a security breach or has been otherwise compromised such that logins to the service 108(2) using the user IDs 116 are more likely to be fraudulent (e.g., made by unauthorized users or processes). The data storage 416 may also store other data 422, such as user authentication information or access control data. In some implementations, at least a portion of the information stored in the data storage 416 may be stored externally to the server device(s) 110, on other devices that may communicate with the server device(s) 110 via the I/O interface(s) 406 or via the network interface(s) 408.

Figure 5:
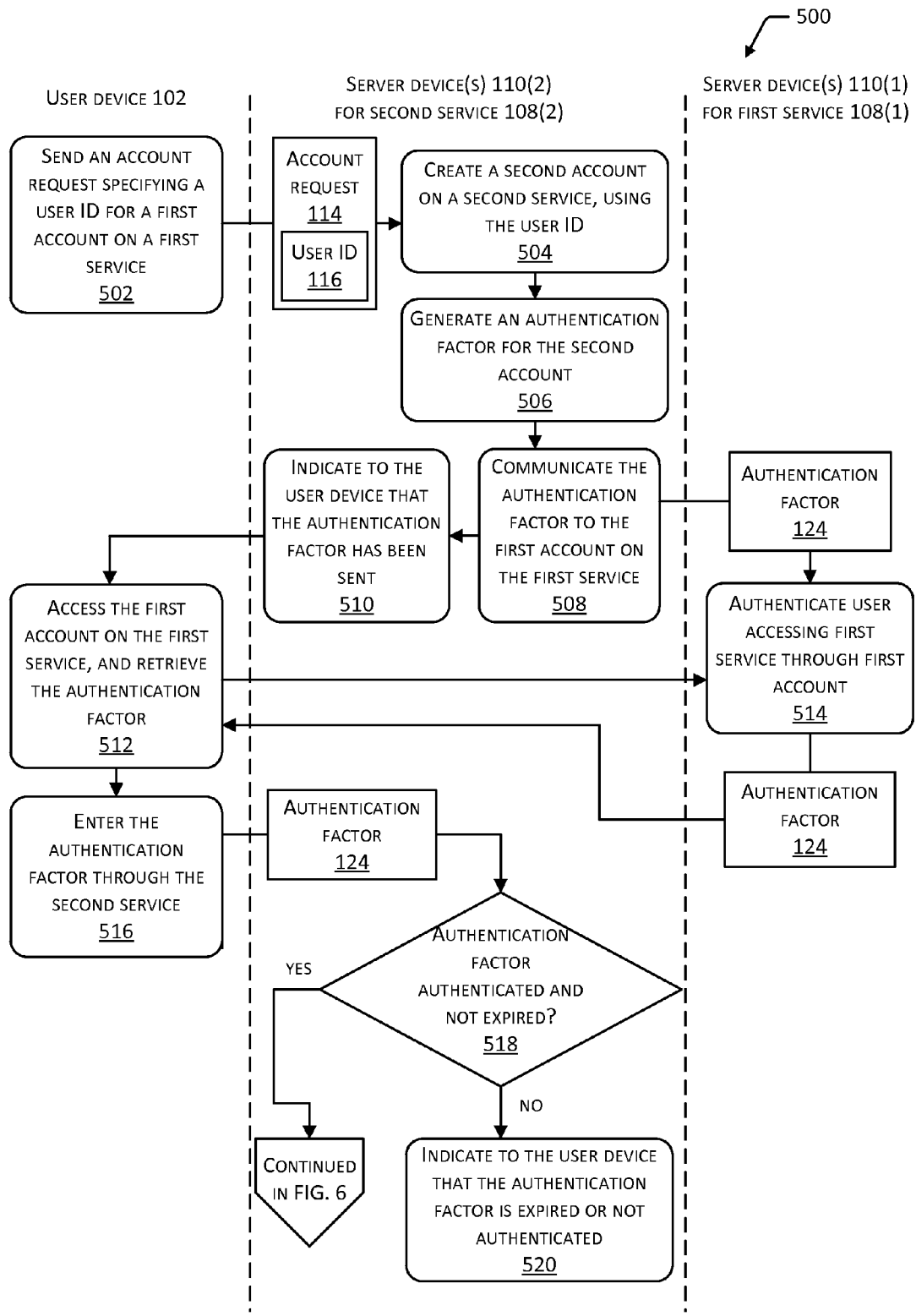
FIG. 5 depicts a flow diagram of a process for creating an account on the second service based on the user identifier of the account on the first service.
Figure 6:
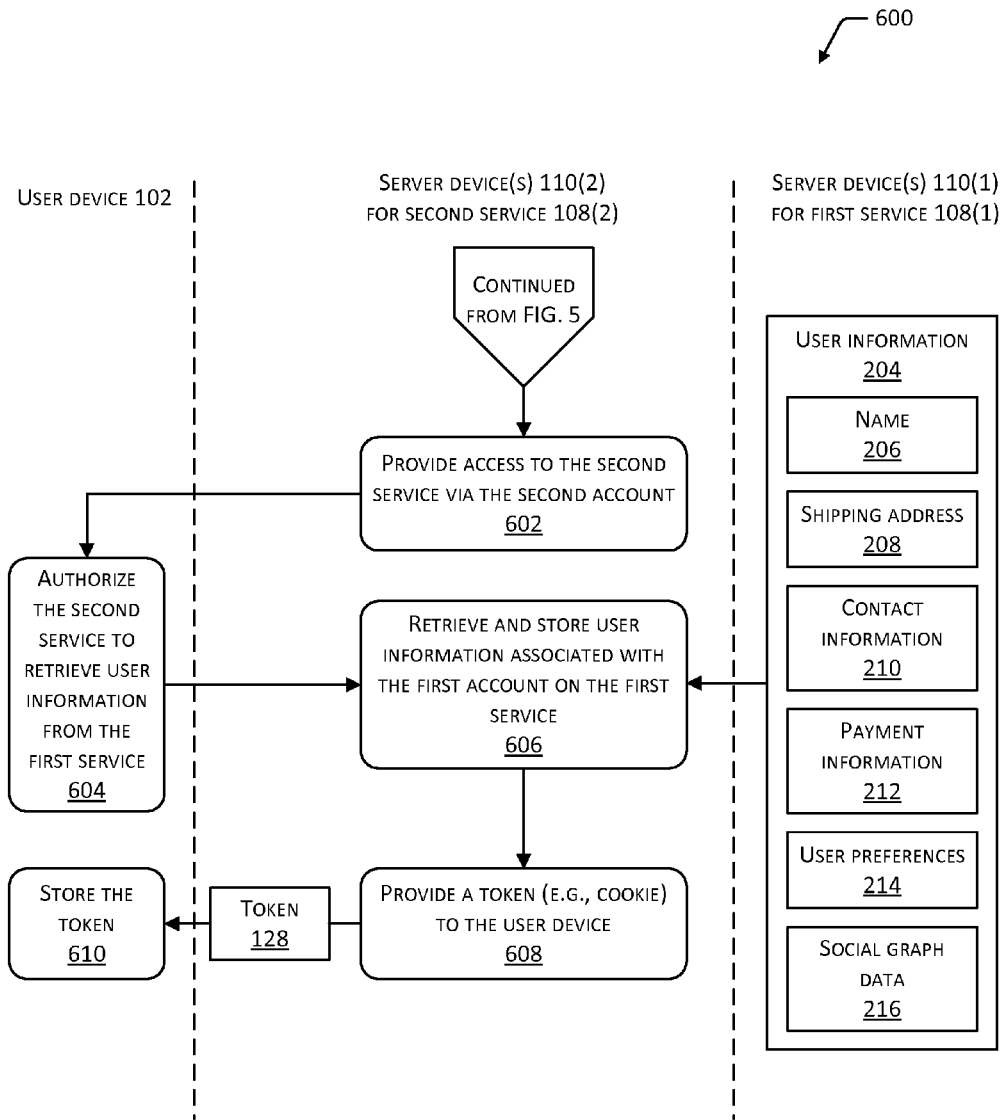
FIG. 6 depicts a flow diagram of a continuation of the process for creating the account on the second service based on the user identifier of the account on the first service.

FIGS. 5 and 6 respectively depict flow diagrams 500 and 600 of a process for creating the account 112(2) on the service 108(2) based on the user ID 116 of the account 112(1) on the service 108(1). Operations of the process may be performed by the user application(s) 106, other modules executing on the user device 102, the service(s) 108, the login portal module 118, the account management module 120, the remote service interface module 126, other modules executing on the server device(s) 110, or other modules executing on other devices.

At 502, the user 104 may employ the user application 106(2) to generate and send the account request 114 requesting access to the service 108(2). The account request 114 may specify the user ID 116 that is the login credential for the account 112(1) on the service 108(1). In some cases, the account request 114 may be generated and sent through a login portal web page or through a login dialog of a web page served by the service 108(2).

At 504, in response to receiving the account request 114, the login portal module 118 may create the account 112(2). The account 112(2) may be created such that the user ID 116 is a login, user name, or other credential for the account 112(2). The account information 122 may be updated to store information for the account 112(2). In some implementations, the account 112(2) may be created with access rights to access a subset of the (e.g., lower risk) features of the service 108(2).

At 506, the authentication factor 124 may be generated for the account 112(2). The authentication factor 124 may be of any length and may include any number of characters of any data type. In some cases, the authentication factor 124 may be generated independently of any information in the user ID 116 and independently of any information that identifies the account 112(2). The user ID 116 may not be derivable based on the authentication factor 124. For example, the authentication factor 124 may be generated using a random or pseudo-random algorithm. An association between the authentication factor 124 and the account 112(2) may be stored in a table or other data structure on the server device(s) 110(2). In some cases, the authentication factor 124 may be stored in the account information 122 with other information for the account 112(2), such that the account information 122 (or another data structure) provides a mapping between the authentication factor 124 and the user ID 116. The authentication factor 124 may be employable to authenticate the user 104 to the service 108(2) and to activate the account 112(2) on the service 108(2). In some cases, the authentication factor 124 may be a nonce that is to be used once to authenticate the user 104 within a period of time.

At 508, the authentication factor 124 may be communicated to the account 112(1) on the service 108(1). For example, the authentication factor 124 may be sent in an email, text message, or other type of message to the account 112(1). The service 108(1) may receive the authentication factor 124 and store it such that it is accessible through the account 112(1). For example, the authentication factor 124 may be sent in a message that is stored such that it is accessible through an inbox or other feature of the service 108(1).

At 510, an indication may be provided to the user device 102, indicating that the authentication factor 124 has been sent to the account 112(1) of the service 108(1). The indication may be provided as a message displayed on the login portal web page through which the user 104 generated the account request 114.

At 512, the user 104 may log into or otherwise access the account 112(1) on the service 108(1) by providing one or more credentials such as the user ID 116 and a password for the account 112(1). At 514, if the credential(s) provided by the user 104 at 512 are authenticated, the user 104 may be authorized to access the account 112(1) to enable the user 104 to retrieve the authentication factor 124.

At 516, the user 104 may enter the authentication factor 124 through a login portal web page or other user interface served by the service 108(2).

At 518, a determination may be made whether the received authentication factor 124 is authenticated and is associated with the user ID 116. Such a determination may be made by comparing the authentication factor 124 entered at 516 with the authentication factor 124 sent to the account 112(1) at 508. For example, implementations may access the account information 122 or another data structure that stores a mapping between the sent authentication factor 124 and the user ID 116. The sent authentication factor 124 corresponding to the user ID 116 may be retrieved from the data structure and compared to the received authentication factor 124. If the two authentication factors 124 do not match, the received authentication factor 124 may be determined as not authenticated. If the two authentication factors 124 match, the received authentication factor 124 may be determined as authenticated. In some implementations, the authentication factor 124 may be generated with a predetermined expiration or timeout period. In such cases, the expiration time of the received authentication factor 124 may be compared to the current time at 518.

If the received authentication factor 124 is determined to be not authenticated or expired, the process may proceed to 520. At 520, an indication may be provided to the user device 102 indicating that the authentication factor 124 entered at 516 is incorrect or unauthenticated. The indication may be provided as a message displayed on the login portal web page through which the user 104 generated the account request 114. The user 104 may then be given the opportunity to re-attempt to enter the correct authentication factor 124. If the received authentication factor 124 is determined to be authenticated and not expired, the process may continue as described with reference to FIG. 6.

At 602, the account 112(2) may be activated and the user 104 may be provided access to the service 108(2) via the account 112(2).

At 604, the user 104 may authorize the service 108(2) to request and receive the user information 204 from the service 108(1). In some implementations, the authorization may include the user 104 specifying the service 108(1) as a trusted entity to request the user information 204 regarding the user 104.

At 606, in some implementations the user information 204 may be requested and retrieved from the service 108(1) and stored as part of the account information 122 on the server device(s) 110(2). As described with reference to FIG. 2, the user information 204 may include one or more of the name 206, the shipping address 208, the contact information 210, the payment information 212, the user preferences 214, or the social graph data 216 for the user 104.

At 608, the token 128 may be generated and provided to the user device 102. At 610, the token 128 may be stored on the user device 102. In some implementations, the token 128 is a HTTP cookie that is received and stored by the web browser that presents the user application 106(2) on the user device 102. A mapping between the token 128 and the account 112(2) may be stored on the server device(s) 110(2), in the account information 122 or elsewhere. The token 128 may be retrieved and authenticated in response to subsequent login requests that specify the user ID 116, such that the created account 112(2) is reusable. Such reusability is described further with reference to FIGS. 7 and 8.

Figure 7:
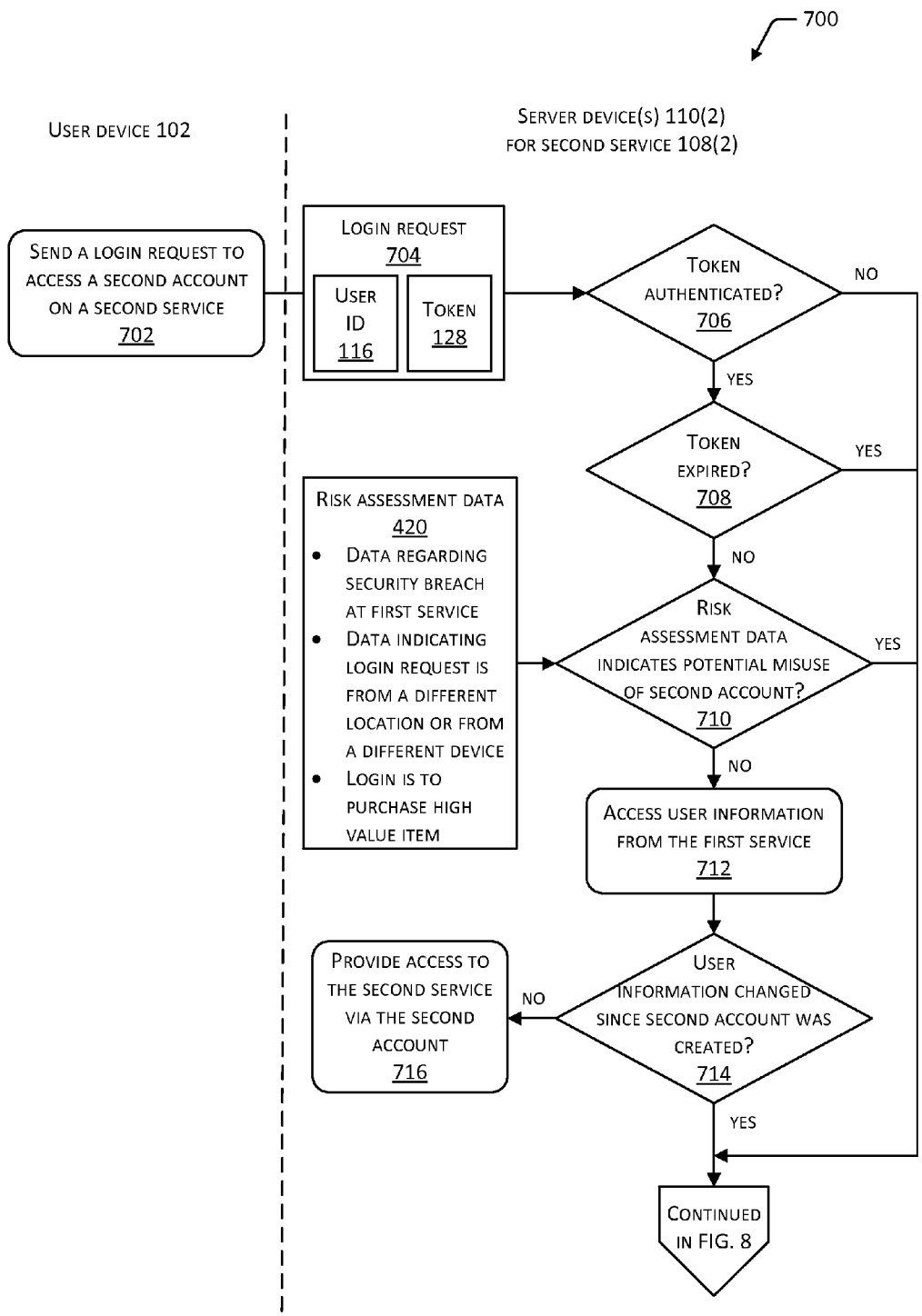
FIG. 7 depicts a flow diagram of a process for providing access to the previously created account on the second service through use of a token.
Figure 8:
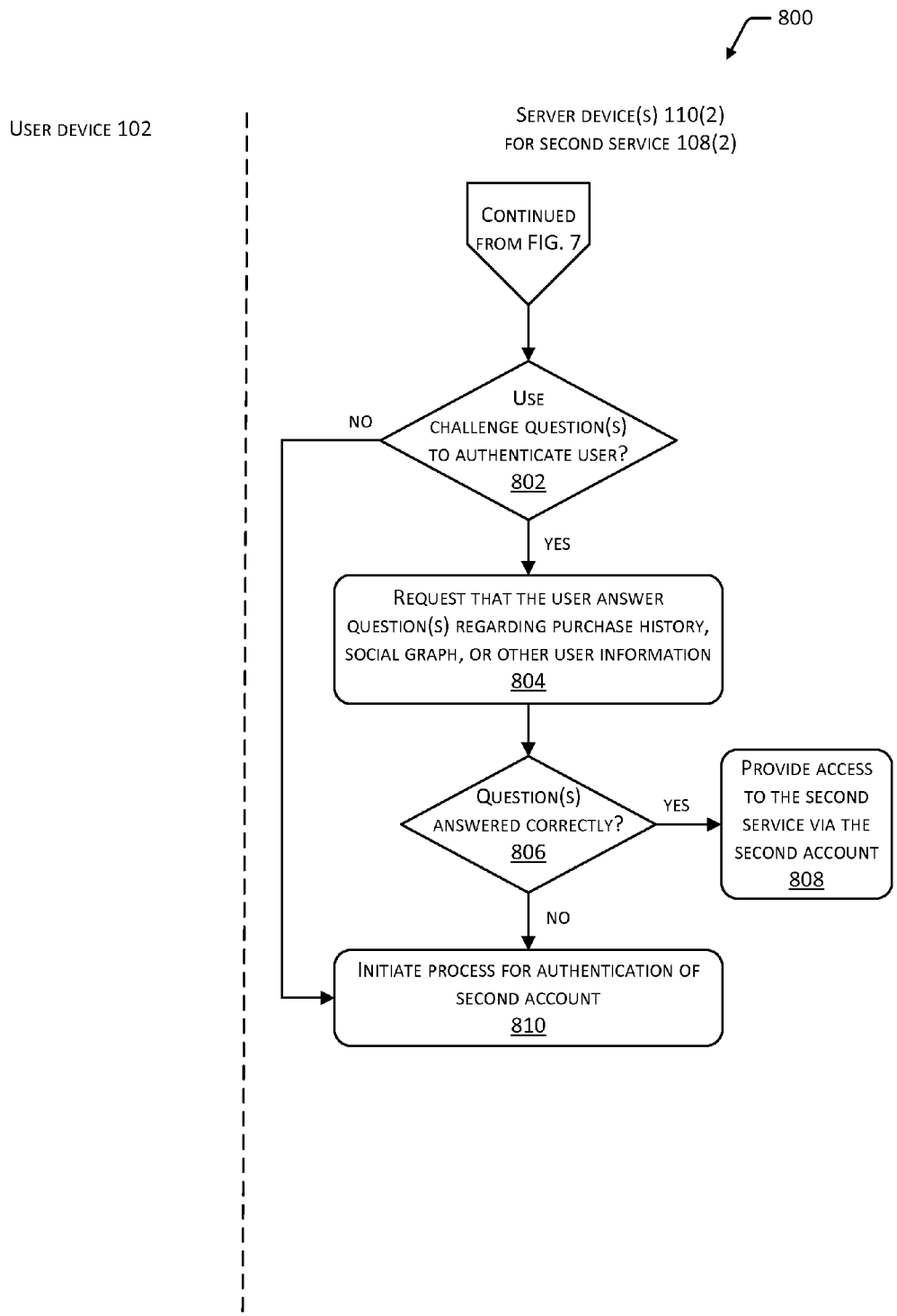
FIG. 8 depicts a flow diagram of a continuation of the process for providing access to the previously created account on the second service.

FIGS. 7 and 8 respectively depict flow diagrams 700 and 800 of a process for providing access to the previously created account 112(2) on the service 108(2) through use of the token 128. Operations of the process may be performed by the user application(s) 106, other modules executing on the user device 102, the service(s) 108, the login portal module 118, the account management module 120, the remote service interface module 126, other modules executing on the server device(s) 110, or other modules executing on other devices.

At 702, a login request 704 is sent from the user device 102 to access the previously created account 112(2) on the service 108(2). The login request 704 may specify the user ID 116. The login request 704 may also include the token 128. For example, in cases where the token 128 is a HTTP cookie the login request 704 may be a HTTP request that includes the cookie.

At 706, a determination is made whether the token 128 is authentic. The determination may be made by comparing the received token 128 to the token 128 that was provided to the user device 102 and stored in the account information 122 or elsewhere on the server device(s) 110(2). If the two tokens 128 correspond to one another, the process may proceed to 708. If not, the process may proceed as described with reference to FIG. 8.

At 708, in implementations that employ a timeout or predetermined expiration period for the token 128, a determination is made whether the token 128 has expired. In some implementations, the token 128 may be valid for a predetermined duration from the time when the token 128 was generated or communicated to the user device 102. In such cases, the token 128 may not be employed to access the account 112(2) after the token 128 has expired. If the token 128 is not expired, the process may proceed to 710. If the token 128 has expired, the process may proceed as described with reference to FIG. 8.

At 710, a determination may be made whether the risk assessment data 420 indicates a potential misuse of the account 112(2). The risk assessment data 420 may include any information that enables implementations to evaluate a risk that the account 112(2) is being employed to attempt fraud or that the account 112(2) is being otherwise misused. For example, the risk assessment data 420 may include data regarding a security breach or other compromise of the service 108(1). Such a breach may indicate that the user ID 116 has been acquired by a malicious user or process, and that the account 112(2) is being accessed for a potentially unauthorized activity.

The risk assessment data 420 may also include data indicating that the login request 704 is from a different geographic location relative to a previous login request or relative to the account request 114. The location of the login requests 704 may be determined based on geolocation of an IP address of the user device 102, based on information collected by a navigation system of the user device 102, based on information regarding the cell tower servicing a user device 102 that is a mobile device, or based on other information. A change in the location of the login request 704 may indicate that a different, possibly unauthorized user 104 is using the account 112(2) to access the service 108(2).

The risk assessment data 420 may also include data indicating that the login request 704 is from a different user device 102 relative to a previous login request or relative to the account request 114. The particular user device 102 that sent the login request 704 or the account request 114 may be determined based on a device identifier that is unique to the user device 102, such as a MAC address, processor identifier, and so forth.

The risk assessment data 420 may also include information indicating that the account 112(2) is being used to purchase a high value item, e.g., a product that has a value above a predetermined monetary value. Such information may be based on a product page that the user 104 is browsing while the login request 704 is generated. Purchase of a high value item may indicate that the account 112(2) is being used in an unauthorized manner. In some implementations, the risk assessment data 420 may include information regarding other types of user behavior or patterns of user behavior. For example, if the user behavior includes suspicious behavior that is anomalous in comparison with typical behavior of the authorized user 104, such behavior may indicate a possible use of the account by an unauthorized user 104.

If the risk assessment data 420 indicates a potential misuse of the account 112(2), the process may proceed as described with reference to FIG. 8. If the risk assessment data 420 does not indicate a potential misuse, the process may proceed to 712.

At 712, current user information 204 may be requested from the service 108(1). At 714, a determination is made whether the user information 204 has changed since the account 112(2) was created. If the user information 204 has not changed, the process may proceed to 716 and the user 104 may be provided access to the service 108(2) via the account 112(2), e.g., the user 104 may be successfully logged into the account 112(2). If the user information 204 has changed, the process may proceed as described with reference to FIG. 8. For example, a change in the social graph data 216, the shipping address 208, the user preferences 214 (e.g., the language preferences), or other user information 204 may indicate that a different, possibly unauthorized user 104 is using the account 112(2) to access the service 108(2).

With reference to FIG. 8, at 802 a determination may be made whether one or more challenge questions are to be used to authenticate the user 104. If so, the process may proceed to 804. If not, the process may proceed to 810 and initiate a (e.g., passcode-based) authentication of the user 104 as described in FIGS. 5 and 6. In some implementations, the user 104 may be given a choice whether to be authenticated based on challenge question(s) or through the passcode-based authentication. In some cases, the determination whether to use challenge question(s) may be based on whether sufficient user information 204 has been received to enable the use of challenge question(s) to authenticate the user 104. In some cases, the determination to use challenge question(s) may be based on the particular criteria that caused the process to reach 802 instead of 716. For example, the nature of the risks described in the risk assessment data 420 may be analyzed to determine whether to use challenge question(s). In some cases, challenge question(s) may be used if the user 104 no longer has access to the account 112(1) on the service 108(1). In some implementations, if the user 104 no longer has access to the account 112(1) the user 104 may be asked to create a password 202 for the account 112(2) as described with reference to FIG. 9, if the user 104 is able to correctly answer the challenge question(s) as described below.

At 804, the user 104 may be requested to answer one or more challenge questions regarding purchase history described in the payment information 212, regarding the social graph data 216, or regarding other user information 204. Such challenge questions may be used to determine whether the user 104 is the same user 104 for whom the account 112(2) was created. For example, the user 104 may be asked to correctly identify one or more past purchases from a list of options. As another example, the user 104 may be asked to correctly identify one or more acquaintances described in their social graph data 216.

At 806, a determination is made whether the user 104 has answered the challenge question(s) correctly, based on comparing the user's answers to the user information 204. If the user 104 answers the challenge question(s) correctly, the process may proceed to 808 and the user 104 may be provided access to the service 108(2) via the account 112(2). If the user 104 fails to answer the challenge question(s) correctly, the process may proceed to 810. At 810, the process for passcode-based authentication of the account 112(2) may be initiated, and may proceed as described with reference to FIGS. 5 and 6. In some cases, a new account 112(2) may be created based on the user ID 116 as described with reference to FIGS. 5 and 6, and the previously created account 112(2) may be deleted or disabled.

Figure 9:
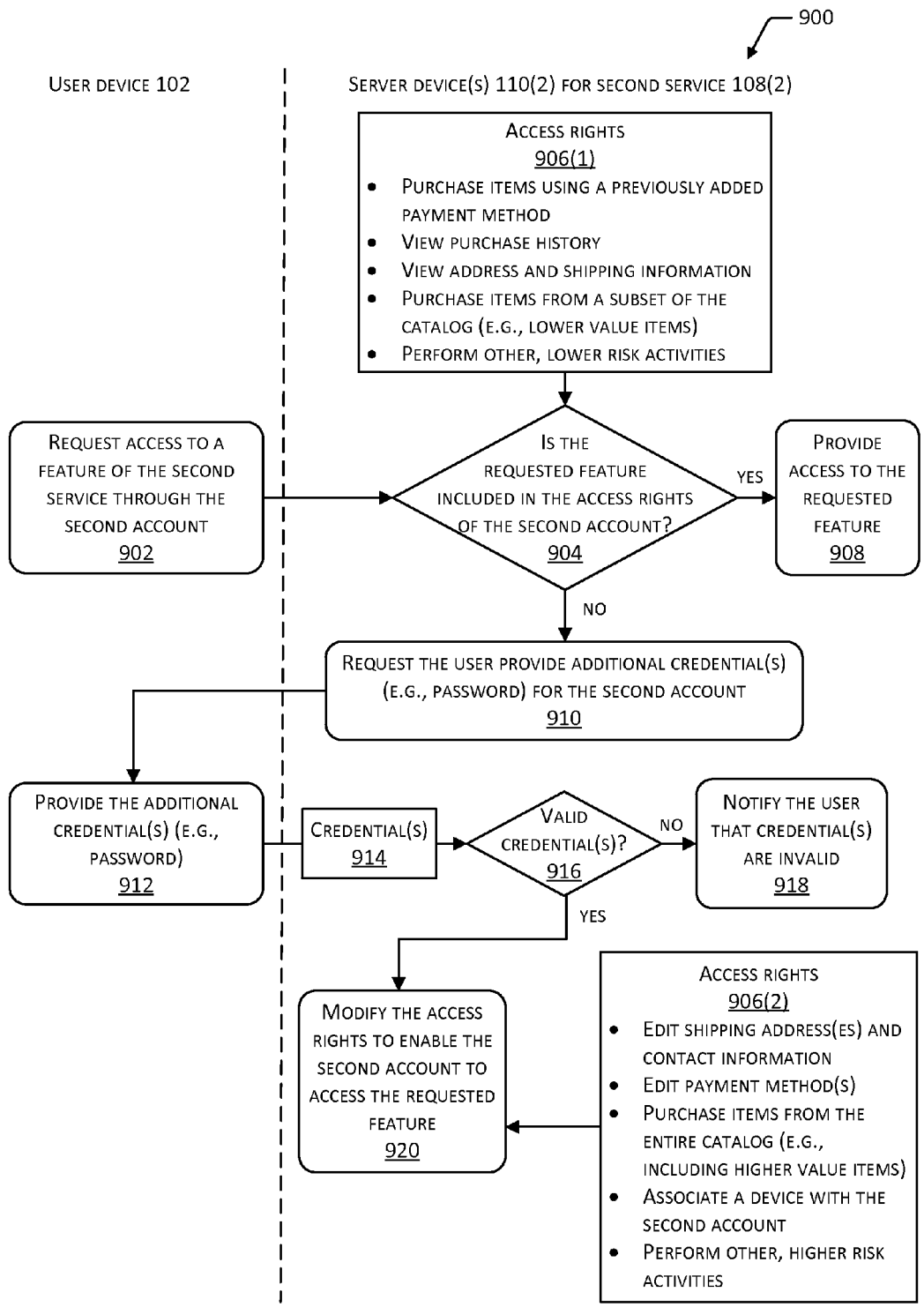
FIG. 9 depicts a flow diagram of a process for altering the access rights of an account based on a user providing an additional credential such as a password for the account.

FIG. 9 depicts a flow diagram 900 of a process for modifying the access rights of the account 112(2) based on the user 104 providing an additional credential such as the password 202 for the account 112(2). Operations of the process may be performed by the user application(s) 106, other modules executing on the user device 102, the service(s) 108, the login portal module 118, the account management module 120, the remote service interface module 126, other modules executing on the server device(s) 110, or other modules executing on other devices.

At 902, the user 104 may employ the user application 106(2) to request access to a feature of the service 108(2) through the account 112(2). At 904, a determination is made whether the requested feature is included in the access rights 906(1) of the account 112(2). The access rights 906(1) may be the set of access rights established for the account 112(2) when it was created. In some implementations, the access rights 906(1) may be a subset of the (e.g., lower risk) features of the service 108(2). For example, the account 112(2) may have been initially configured to have access to features enabling the user 104 to perform one or more of the following: purchase items using a previously added payment method (e.g., credit card or payment card); view the purchase history of past purchases, shipments, or other transactions; view address and shipping information; or purchase items from a subset of the catalog of the service 108(2), such as items below a threshold monetary value.

If the requested feature is included in the access rights 906(1), the process may proceed to 908 and provide access to the requested feature. If the requested feature is not included in the access rights 906(1), the process may proceed to 910.

At 910, the user 104 may be requested to provide one or more additional credentials 914. For example, the user 104 may be requested to provide a password 202 that may be associated with the account 112(2). At 912, the user 104 may provide the additional credential(s) 914. In some implementations, the providing of the additional credential(s) 914 may be based at least partly on an authentication of the user 104 through the service 108(1). For example, the user 104 may provide the additional credential(s) 914 after logging into the user's account 112(1) on the service 108(1). In some cases, the request for the additional credential(s) 914 may be sent to the user's account 112(1) on the service 108(1). The authentication of the user 104 on the service 108(1) may proceed as described with reference to FIG. 5.

At 916, the credential(s) 914 may be validated. For example, if the credential(s) 914 include a password, the password may be analyzed to determine whether it is of a sufficient length or complexity to provide adequate security for the account 112(2). If the credential(s) 914 are determined to be invalid, the process may proceed to 918 and notify the user 104 that the credential(s) 914 are invalid. The user 104 may then provide different credential(s) 914. In some implementations, the validation of the credential(s) 914 may also be based at least partly on the authentication of the user 104 through the service 108(1). For example, the credential(s) 914 may not be determined to be valid unless the credential(s) 914 are received in a communication sent from the service 108(1) during an authenticated login of the user 104 to the user's account 112(1) on the service 108(1). If the credential(s) 914 are determined to be valid, the specified password may be designated (e.g., set) for the account 112(2). The process may then proceed to 920.

At 920, the access rights 906(1) for the account 112(2) may be modified and replaced with a different set of access rights 906(2), to enable the account 112(2) to access the feature requested at 902. In some cases, the access rights 906(2) may include all the features of the service 108(2) or may include a broader subset of the features that the subset accessible through the access rights 906(1). The access rights 906(2) may include those (e.g., higher risk) features that may be more susceptible to fraud or misuse, such as one or more of the following: edit shipping information and contact information (e.g., address information) for the user 104; edit payment method(s), including credit card(s), payment card(s), or other payment instrument(s) stored for the user 104; purchase items from the entire catalog provided by the service 108(2), including higher value items; or associate a user device 102 with the account 112(2).

In some implementations, the process of FIG. 9 may also include at least a portion of the process for passcode-based authentication of the user 104 as described in FIGS. 5 and 6. For example, if the user 104 requests to add a password 202 to the account 112(2), the user 104 may be asked to perform the passcode-based authentication to verify the user's identity through the account 112(1). In some cases, if the user 104 requests to add a password 202 to the account 112(2), the user 104 may be asked to answer one or more challenge questions as described with reference to FIG. 8.

Figure 10:
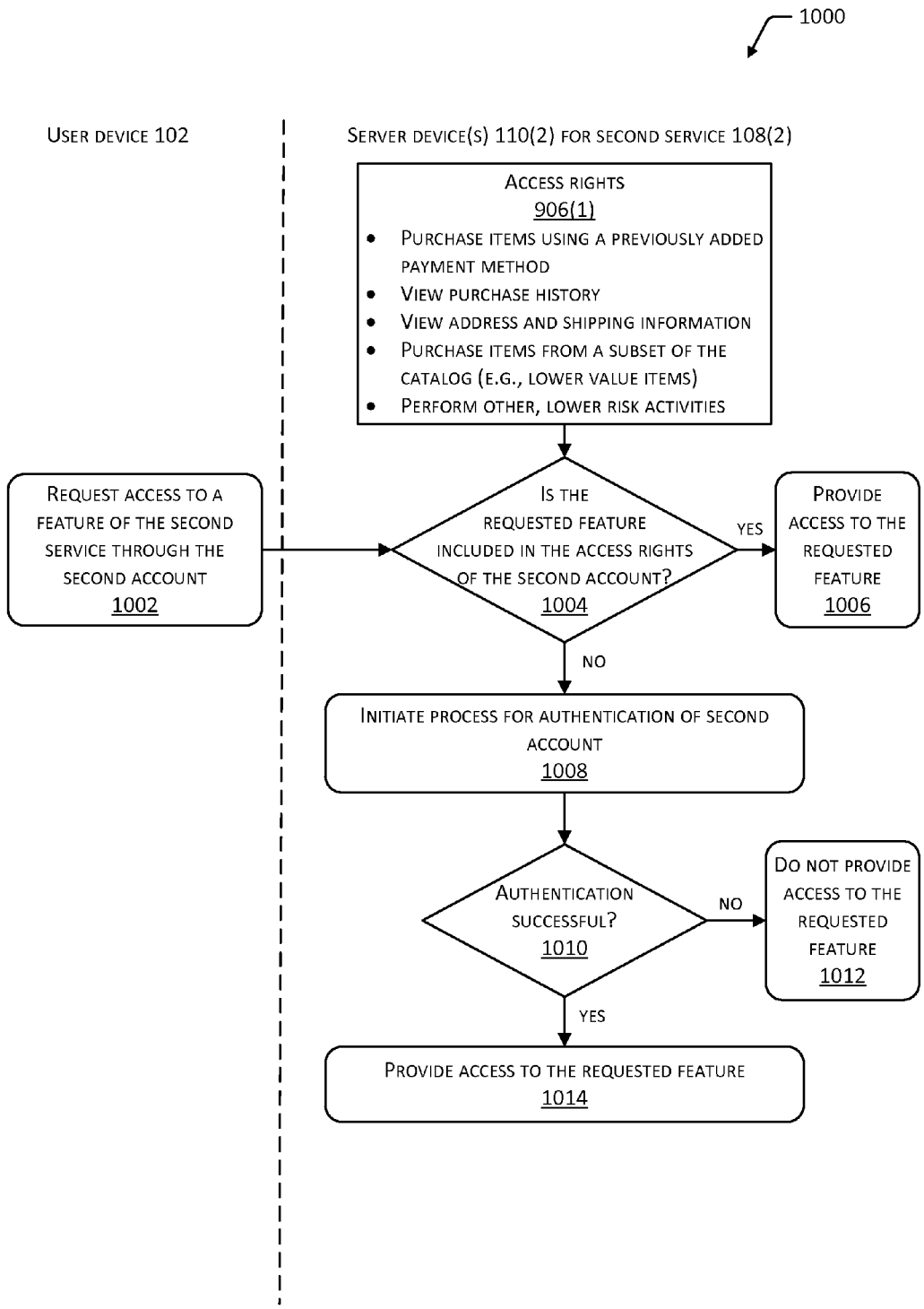
FIG. 10 depicts a flow diagram of a process for enabling access to a feature of an account based on successful passcode-based authentication.

FIG. 10 depicts a flow diagram 1000 of a process for enabling access to a feature of the account 112(2) based on successful passcode-based authentication. Operations of the process may be performed by the user application(s) 106, other modules executing on the user device 102, the service(s) 108, the login portal module 118, the account management module 120, the remote service interface module 126, other modules executing on the server device(s) 110, or other modules executing on other devices.

In some cases, the user 104 may request access to a feature of the account 112(2), and the feature may be deemed sensitive or high-risk. In such cases, the user 104 may be prompted to repeat the passcode-based authentication process as described in FIGS. 5 and 6, to verify the user's identity. For example, the user 104 may be sent through the passcode-based authentication process if the user 104 requests to add a password 202 to the account 112(2), add a payment method, change a shipping address, create a sub-account under the account 112(2), subscribe to other service(s), or perform other activities.

At 1002, the user 104 may employ the user application 106(2) to request access to a feature of the service 108(2) through the account 112(2). At 1004, a determination is made whether the requested feature is included in the access rights 906(1) of the account 112(2), as described with reference to FIG. 9. If the requested feature is included in the access rights 906(1), the process may proceed to 1006 and provide access to the requested feature. If the requested feature is not included in the access rights 906(1), the process may proceed to 1008.

At 1008, the process for (e.g., passcode-based) authentication of the user 104 may be initiated, as described with reference to FIGS. 5 and 6. At 1010, a determination is made whether the authentication is successful. If not, at 1012 the user 104 may not be provided access to the requested feature. In some cases, the user 104 may be prompted to repeat the passcode-based authentication. If the authentication is successful, the process may proceed to 1014 and the user 104 may be provided access to the requested feature.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
   receiving, from one or more of a user device or a first service, an indication of an account request specifying a user identifier that is employable by the user device, to log into a first account on a first service, wherein the account request includes a request for access to a second service;
   creating a second account on the second service including not indicating to the user device that the second account is being created, the second account configured such that the user identifier for the first account is assigned as a login to the second account on the second service, the second account including access rights to access a subset of features of the second service;
   generating an authentication factor associated with the access to the second service;
   storing, in a data structure, an association between the authentication factor and the second account;
   sending the authentication factor to the first service, enabling the user device to retrieve the authentication factor through an authenticated access to the first account on the first service;
   determining, based on the data structure, that the one or more of the user device or the first service has provided the authentication factor to request access to the second service;
   providing the one or more of the user device or the first service with access to the second account on the second service, in response to determining that the one or more of the user device or the first service has provided the authentication factor;
   receiving, from the user device, a login request to access the second service; and
   denying access to the second account on the second service in response to the login request based on one or more of: risk assessment data or a change in user information received from the first service;
   the risk assessment data describing one or more of:
      a security breach at the first service;
      the login request was received from a different user device than a previous login request specifying the user identifier;
      the login request originated from a different location than a previous login request specifying the user identifier; or
      the login request was submitted to purchase an item associated with a monetary value greater than a threshold monetary value; and
   the user information including one or more of:
      a social graph of a user associated with the user identifier;
      a language preference of the user associated with the user identifier; or
      address information for the user associated with the user identifier.

2. The method of claim 1, further comprising:
   providing a token to the user device, the token indicating a communication session between the user device and the second service, the token associated with the second account;
   during a login request to access the second service, receiving the token from the user device, the login request not including a user-specified authentication factor;
   authenticating the token; and
   based on the authentication of the token, providing access to the second account on the second service in response to the login request.

3. The method of claim 1, wherein:
   the subset of features is a first subset of features; and
   the method further comprises:
      in response to receiving a user-specified authentication factor that is provided for the second account via the user device, modifying the access rights to enable the second account to access a second subset of features of the second service, the second subset including a larger number of features than the first subset.

4. The method of claim 1, wherein the creating of the second account on the second service includes generating an unpublished authentication factor for the second account, the unpublished authentication factor not provided to the user device.

5. A system, comprising:
   at least one computing device configured to implement one or more services, wherein the one or more services are configured to:
      receive an indication of an account request specifying a user identifier that is employable to log into a first account on a first service, wherein the account request includes a request for access to a second service;
      create a second account on the second service, the second account configured such that the user identifier for the first account is assigned as a login to the second account on the second service, the second account including access rights to access a first subset of features of the second service;
      send, to the first account on the first service, an authentication factor associated with the second account, enabling the first authentication factor to be retrieved through an authenticated access to the first account on the first service;
      detect that the authentication factor has been provided through the second service;

provide access to the second account on the second service, on determining that the authentication factor has been provided through the second service;

in response to receiving at least one credential that is provided for the second account, modifying the access rights to enable the second account to access a second subset of features of the second service, the second subset including a larger number of features than the first subset;

receive, from a user device, a login request to access the second service; and deny access to the second account on the second service in response to the login request, based on risk assessment data describing one or more of:
- a security breach at the first service;
- the login request was received from a different user device than a previous login request specifying the user identifier;
- the login request originated from a different location than a previous login request specifying the user identifier; or
- the login request was submitted to purchase an item associated with a monetary value greater than a threshold monetary value.

6. The system of claim 5, wherein the one or more services are further configured to:
provide a token to a user device that sent the account request, the token indicating a communication session between the user device and the second service, the token associated with the second account;
receive a login request to access the second service, the login request received after the creating of the second account and before the receiving of the at least one credential, the login request not including the at least one credential;
during the login request, receive the token from the user device;
authenticate the token; and
based on the authentication of the token, provide access to the second account on the second service in response to the login request.

7. The system of claim 6, wherein the token is included in a Hypertext Transfer Protocol (HTTP) cookie.

8. The system of claim 5, wherein the one or more services are further configured to:
deny access to the second account on the second service in response to the login request, based on a change in user information received from the first service, the user information including one or more of:
- a social graph of a user associated with the user identifier;
- a language preference of the user associated with the user identifier; or
- address information for the user associated with the user identifier.

9. The system of claim 5, wherein:
the second service is a web service;
the account request is provided through a web portal of the web service; and
the second authentication factor is provided through the web portal.

10. The system of claim 5, wherein the first service includes one or more of:
a social network service;
an online merchant;
a payment service; or
a messaging service.

11. The system of claim 5, wherein the creating of the second account on the second service includes generating an unpublished authentication factor for the second account, the unpublished authentication factor not provided to a user of the second account.

12. The system of claim 5, wherein the at least one credential includes a password for the second account.

13. One or more non-transitory computer-readable media storing instructions which, when executed by at least one processor, instruct the at least one processor to perform actions comprising:
receiving an indication of an account request from a user device, the account request specifying a user identifier that is employable to log into a first account on a first service, the account request to request access to a second service;
creating a second account on the second service including not providing an indication to the user device that the second account is being created, the second account configured such that the user identifier for the first account is assigned as a login to the second account on the second service;
sending, to the first account on the first service, an authentication factor associated with the second account, enabling the authentication factor to be retrieved through an authenticated access to the first account on the first service;
providing access to the second account on the second service, based at least partly on determining that the authentication factor has been provided through the second service;
receiving a login request from the user device; and
denying access to the second account on the second service in response to the login request, based on a change in user information received from the first service, the user information including one or more of:
- a social graph of a user associated with the user identifier;
- a language preference of the user associated with the user identifier; or
- address information for the user associated with the user identifier.

14. The one or more non-transitory computer-readable media of claim 13, wherein the actions further comprise:
providing a first token to the user device that sent the account request, the first token indicating a communication session between the user device and the second service, the first token associated with the second account;
receiving a login request to access the second service, the login request not including a user-specified authentication factor for the second account;
during the login request, receiving a second token from the user device;
authenticating the second token by comparing the first token to the second token; and
based on the first token corresponding to the second token, providing access to the second account on the second service in response to the login request.

15. The one or more non-transitory computer-readable media of claim 14, wherein the token is included in a Hypertext Transfer Protocol (HTTP) cookie.

16. The one or more non-transitory computer-readable media of claim 13, wherein the actions further comprise:
denying access to the second account on the second service in response to the login request, based on risk assessment data describing one or more of:
- a security breach at the first service;
- the login request was received from a different user device than a previous login request specifying the user identifier;

the login request originated from a different location than a previous login request specifying the user identifier; or the login request was submitted to purchase an item having a monetary value greater than threshold monetary value.

17. The one or more non-transitory computer-readable media of claim 13, wherein:

the second account is created with access rights to access a first subset of features of the second service; and the actions further comprise:

designating a password for the second account based at least partly on an authenticated access to the first service; and modifying the access rights to enable the second account to access a second subset of features of the second service, the second subset including a larger number of features than the first subset.

18. The one or more non-transitory computer-readable media of claim 13, wherein the providing of the access to the second account on the second service is further based on determining that an elapsed time is at or below an expiration time period, the elapsed time being a duration from the sending of the passcode to the entering of the passcode through the second service.

\* \* \* \* \*